United States Patent [19]

Belke et al.

[11] 4,277,938

[45] Jul. 14, 1981

[54] COMBINATION ROTATING FLUIDIZED BED COMBUSTOR AND HEAT EXCHANGER

[75] Inventors: William H. Belke, Peoria; George B. Grim, Washington, both of Ill.

[73] Assignee: Caterpillar Tractor Co., Peoria, Ill.

[21] Appl. No.: 136,654

[22] PCT Filed: Oct. 15, 1979

[86] PCT No: PCT/US79/00843

§ 371 Date: Oct. 15, 1979

§ 102 (e) Date: Oct. 15, 1979

[51] Int. Cl.³ .................. F02C 3/26; F23D 19/00
[52] U.S. Cl. .................. 60/39.35; 60/39.46 S; 60/39.51 H; 431/170; 165/104.16
[58] Field of Search ......... 60/39.16 R, 39.35, 39.46 S, 60/39.51 R, 39.51 H; 431/7, 170; 432/15, 58; 122/4 D; 165/104 F, 179

[56] References Cited

U.S. PATENT DOCUMENTS

| | | | |
|---|---|---|---|
| 2,930,405 | 3/1960 | Welsh | 165/179 |
| 3,565,022 | 9/1971 | Bishop | 122/4 D |
| 3,912,002 | 10/1975 | Elliot | 165/104 |
| 4,031,953 | 6/1977 | Kline | 60/39.51 R |
| 4,039,272 | 8/1977 | Elliot | 431/7 |
| 4,148,186 | 4/1979 | Virr | 60/39.35 |
| 4,161,103 | 7/1979 | Horgan et al. | 60/39.35 |
| 4,177,636 | 12/1979 | Horgan | 60/39.35 |
| 4,183,208 | 11/1980 | Horgan et al. | 60/39.12 |

OTHER PUBLICATIONS

J. Swithenbank, "Rotating Fluidized Bed Combuster/Gasifier".
Demircan, et al., "Rotating Fluidized Bed Combuster", *Fluidization*, Cambridge University Press, (1978), pp. 270-275.
Broughton, et al., "Heat Transfer and Combustion in Centrifugal Fluidized Bed", I. Chem E. Sympos. Ser. No. 43, (Jun., 1975).

*Primary Examiner*—Louis J. Casaregola
*Attorney, Agent, or Firm*—Sixbey, Bradford & Leedom

[57] ABSTRACT

A combination rotating fluidized bed combustor and rotating fluidized bed heat exchanger particularly adaptable as the combustor and heat exchange unit, respectively, of conventional gas turbine engines is preferably arranged with the combustor nested within the heat exchanger for maximum compactness. The heat exchanger comprises an annular fluidized bed, defined by inner and outer spaced apart coaxial cylindrical, perforated walls, which rotates about the longitudinal axis of the cylinders. The bed is comprised of pulverulent inert particulate material and includes fluid-containing heat exchange tubes passing substantially longitudinally therethrough. Hot gases, such as turbine exhaust gases, enter the bed through the outer perforated wall, heat and fluidize the bed particles, heat the gas, usually compressed air, in the tubes, and exit the bed through the inner perforated wall. The heat exchange tubes direct the compressed air flowing therein from an inlet adjacent the inner perforated wall to an outlet adjacent the outer perforated wall such that the compressed air flows substantially countercurrently to the hot fluidizing gas. The combustor also comprises an annular fluidized bed, defined by inner and outer spaced apart coaxial, cylindrical, perforated walls, which rotates about the longitudinal axis of the cylinders. The heated, compressed air exiting the heat exchanger tubes and solid or liquid fuel enter the combustor bed through the outer perforated wall and fluidize the bed. The air reacts with the fuel within the bed to produce hot combustion gas which exits the bed, together with unreacted compressed air, through the inner perforated wall. When employed with gas turbine engines, the gases exiting the bed are directed into and through the vanes of the gasifier turbine and the power turbine and then into the rotating fluidized bed heat exchanger as the heating and fluidizing medium therefor.

63 Claims, 4 Drawing Figures

COMBINATION ROTATING FLUIDIZED BED COMBUSTOR AND HEAT EXCHANGER

DESCRIPTION

1. Technical Field

The present invention relates to fluidized bed combustor systems and heat exchangers and, more particularly to rotating fluidized bed combustor systems and heat exchangers useful, in combination, in gas turbine engines.

2. Background Art

It is generally well known that simple cycle gas turbines are rather compact units whereas recuperated gas turbines tend to be relatively bulky. This is due in part to the relatively low energy density of conventional combustors and the relatively large primary surface heat exchanger volume necessarily employed in conventional recuperators. Static fluidized bed combustor systems and heat exchangers have been recognized to offer some advantages over conventional units, although in many instances the advantages are only marginal. Typically, fluidized beds which are in use today are of the static bed type which are established when air or other fluidizing gas is introduced into a plenum chamber under pressure and forced upwardly through a diffusing medium (e.g., membrane, grate) to a superimposed chamber containing a powder (particulate) bed of inert or reactive, finely divided, pulverulent solid material. Gas, forced upwardly through the diffusing medium under a sufficient predetermined pressure fluidizes the particulates. The gas pressure required to accomplish this is determined, in part, by the nature and degree of fineness of the particulates to be fluidized. Other influencing factors are the depth of the bed and the size, number and design of the plenum chamber compartments and passages into the superimposed fluidizing chamber.

The energy density in an exothermic gas-solid interaction, such as takes place when a solid fuel is combusted in an air fluidized bed, depends to a major extent on the rate at which the reactants are brought together and the rate at which the combustion products are removed. In conventional, static fluidized beds, by and large, the rate at which the fluidizing air can be blown through the bed is limited by the fact that the fluidizing currents within the fluidized zones are vertical, i.e., only the gravity force on the bed particles opposes the balancing air force needed to maintain fluidization. If the force opposing the balancing air force could be increased, then the air flow rate through the bed could be increased and the energy density of the system would be increased. This can be accomplished using rotating fluidized beds wherein the fluidizing air forced through the bed from its periphery opposes the centrifugal force tending to throw the bed particles outwardly from the bed axis of rotation toward the bed periphery. The extent of the centrifugal force and, thus, of the opposing fluidizing air rate can be controlled by controlling the speed of bed rotation. As a result of increasing the energy density, rotating fluidized beds used as combustors, e.g., as turbine combustors, occupy only about two-thirds the volume of conventional static fluidized bed combustors. In some applications where size is critical this can be a considerable advantage, especially when the combustor burns fuels which inherently require large volumes, such as powdered coal.

The use of a rotating fluidized bed combustor in a gas turbine engine offers significant net owning and operating cost advantages when compared to present gas turbine engines, as disclosed in concurrently filed, co-pending application entitled "Rotating Fluidized Bed Combustor", assigned to the same assignee as the present invention and application. The principal advantage of a rotating fluidized bed combustor over a static fluidized bed combustor is the reduced volume necessary to produce a specified power level, i.e., enhanced energy density. Energy densities in the range of 200 megawatts per cubic meter, two or three times that of conventional turbine combustors, can be obtained in rotating fluidized bed units. Rotating fluidized combustors also exhibit improved chemical reaction rate and better combustion, both of which contribute to more effective control of undesirable emissions. This is mainly attributable to the rapid diffusion of reactants and rapid removal of chemical reaction products attainable in rotating fluidized beds where the mixing results in a homogeneous bed which has better combustion and emission control. Furthermore, rotating fluidized bed combustors have a multi-fuel capability, being capable of burning gaseous fuels, solid fuels or very viscous fuels which cannot be atomized for use in conventional combustors. Indeed, a fluidized bed can be used for oxidizing almost any material that has an exothermic reaction.

A form of rotating fluidized bed combustor system is disclosed by J. Swithenbank in his article "Rotating Fluidized Bed Combustor/Gasifier". The Swithenbank system includes a vertical shaft around which rotates a generally cylindrical combustor using natural gas as the fuel. The gas is introduced at the center of the combustor, i.e., along the axis of rotation, and is mixed with fluidizing air forced through the bed particles from the bed periphery toward the center. The bed, which is heated by the combustion heat generated and the mixing action accompanying rotation, preheats the entering fluidizing air. Most of the combustion between the heated air and the natural gas appears to occur outside, rather than within, the bed itself. Cooling coils passing through the bed carry air which is heated by the combustion and serve to control the bed and exhaust gas temperature. Swithenbank states that his combustion system may be operated by burning or gasifying coal granules in the fluidized bed, but discloses no combustor configuration suitable for use with coal fuels. Moreover, Swithenbank's configuration, requiring introduction of the fuel along the axis of rotation, detracts from the attainment of maximum energy density because it diminishes the compactness of the system. See also, Demircan et al, *Rotating Fluidized Bed Combustor*, published in "Fluidization" by Cambridge University Press (1978). Other publications of interest in connection with the heat transfer and combustion characteristics of natural gas fueled rotating fluidizing beds are J. Broughton and G. E. Elliott, *Heat Transfer and Combustion in Centrifugal Fluidized Bed*, I. Chem E. Symposium Series No. 43 (paper to be presented at June, 1975 meeting) and G. C. Lindauer et al, *Experimental Studies on High Gravity Rotating Fluidizing Bed*, U.S. Atomic Energy Commission, BNL-50013 (Sept. 1966).

Another important characteristic of a fluidized bed is its very high heat transfer. The values for the heat transfer coefficient between the bed and surfaces within the bed have been reported as high as 180 BTU/hr-ft$^2$-°F. for a static fluidized bed. In rotating beds, heat transfer coefficients along surfaces within the bed may be on the order of 240 BTU/hr-ft$^2$-°F. By comparison, the heat transfer coefficient between a tube and gas flowing therewithin in conventional, non-fluidized bed environments is on the order of 10-25 BTU/hr-ft$^2$-°F. Investigations have determined that the characteristics of rotating fluidized beds which lead to such unusually high heat transfer coefficients within the bed can be used to great advantage in a heat exchanger, particularly as an alternative to primary surface heat exchangers in gas turbine engines as disclosed in concurrently filed copending application entitled "Rotating Fluidized Bed Heat Exchanger" assigned to the same assignee as the present invention and application.

Until recently, the potential of rotating fluidized beds for use in gas turbine engines has been unexplored. In the aforementioned concurrently filed, copending applications, rotating fluidized beds are disclosed for use in connection with gas turbine engines as combustors and heat exchangers. However, in order to achieve maximum benefit from the advantageous characteristics of rotating fluidized beds, a gas turbine engine configuration employing such beds for a number of its component elements in operative association to attain maximum compactness would be particularly desirable.

The foregoing illustrates limitations of the known prior art. Thus, it is apparent that it would be advantageous to provide an alternative to the prior art.

DISCLOSURE OF THE INVENTION

In one aspect of the present invention this is accomplished by providing a combination rotating fluidized bed combustor and heat exchanger including a heat exchanger comprising a fluidization chamber containing a bed of fluidized pulverulent solid particles in which a plurality of heat exchanger tubes are disposed. The fluid to be heated is directed via the tubes through the fluidized bed and is heated by a relatively hot fluid stream passing over the tubes. The heated fluid exiting the heat exchanger tubes and a combustible fuel react in the fluidization chamber of the combustor as they move in the same direction through a bed of pulverant particles therein which are fluidized by the heated fluid from the heat exchanger tubes. The gaseous combustion products and unreacted heated fluid exit the combustor fluidization chamber and are directed away therefrom.

In another aspect of the invention, the heat exchanger fluidization chamber includes outer and inner, spaced apart, substantially cylindrical coaxial walls. As the chamber is rotated about its axis, the bed particles centrifugally gravitate toward the outer wall. A relatively hot gaseous agent is fed into the chamber through the outer perforated wall, passes through and fluidizes the bed particles, passes over the heat exchanger tubes and exits the chamber through the inner perforated wall. The fluid to be heated, preferably a gas, enters an inlet tube which extends substantially longitudinally along the inner wall, is directed radially outwardly toward the outer wall and exits the bed through an outlet tube which extends substantially longitudinally along the outer wall. As a result the gas to be heated flows substantially countercurrently to the flow of the fluidizing hot gaseous agent stream.

In still another aspect of the invention the combustor fluidization chamber also includes outer and inner, spaced apart, substantially cylindrical coaxial walls. As the chamber is rotated about its axis, the bed particles centrifugally gravitate toward the outer wall. The heated gas exiting the heat exchanger tubes enters the combustor fluidization chamber through the outer perforated wall and fluidizes the bed particles therein. Generally, the fuel is fed to the fluidized bed with the fluidizing gas, particularly if the fuel is solid, such as powdered coal. The fluidizing gas, heated by the bed which is already hot from prior combustion, reacts with the fuel to form hot combustion gases and the unreacted fluidizing gas exits the fluidized bed with the hot combustion gases through the perforated inner wall.

In an especially useful application, the rotating fluidized bed combustor is nested within the rotating fluidized bed heat exchanger. Desirably, the combustor and heat exchanger are employed as the combustor and recuperator section heat exchanger, respectively, in a conventional gas turbine engine.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
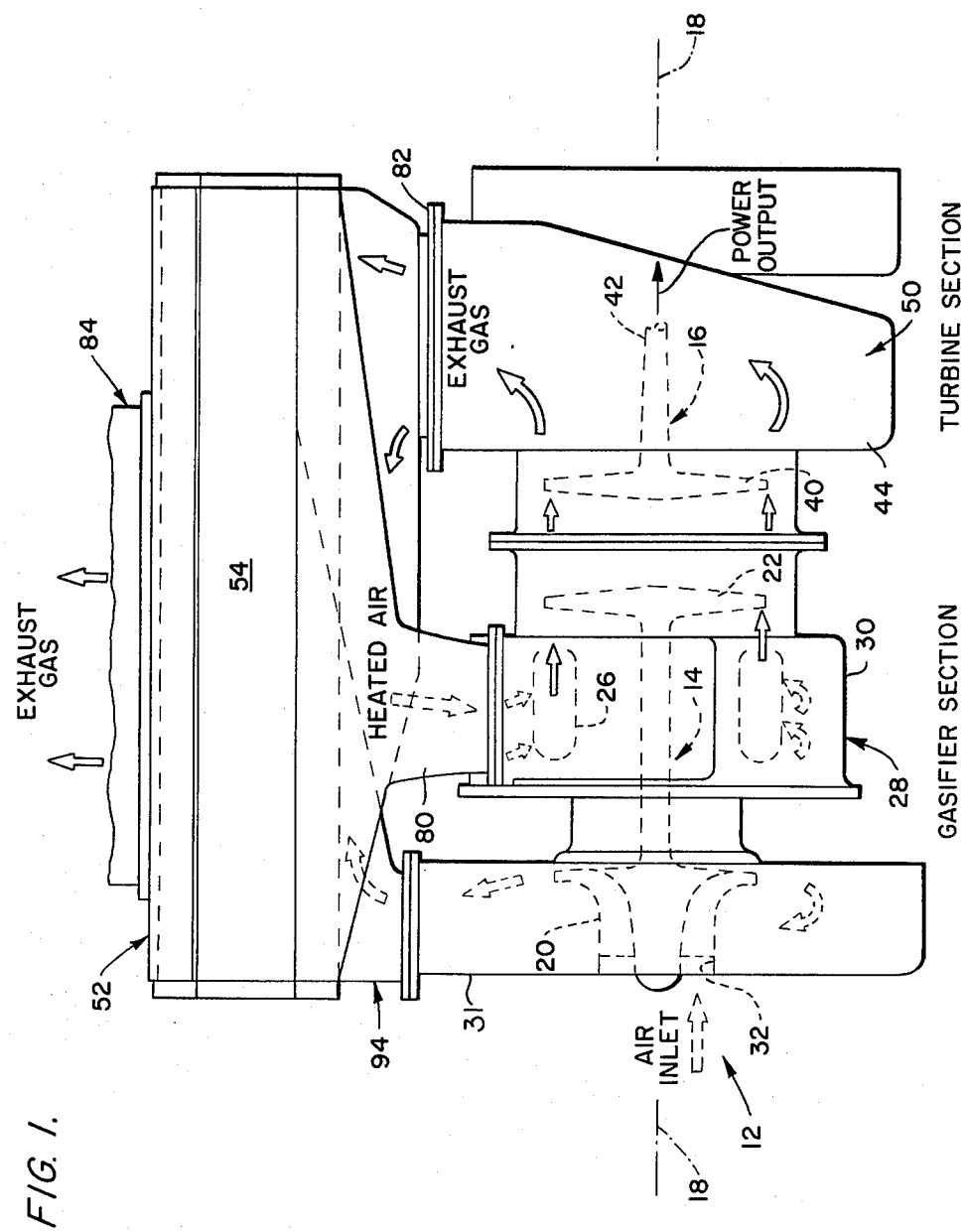
FIG. 1 is a side elevational schematic view of a conventional gas turbine engine in which the combination rotating fluidized bed combustor and rotating fluidized bed heat exchanger may be used.

The rotating fluidized bed combustor and heat exchanger combination of the present invention has utility whereever such components are generally used, but is particularly adaptable for mounting on a gas turbine engine to produce combustion gases for driving the turbines and to transfer the residual thermal energy of the power turbine exhaust gases to the compressed air fed to the gas turbine combustors. With reference to FIG. 1, the rotating fluidized bed combustor system and rotating fluidized bed heat exchanger combination of the present invention can, in a very compact manner, be mounted within and supported by an otherwise conventional gas turbine engine 12. The gasifier section 28 of engine 12 includes a rotatable front shaft assembly 14 having a compressor 20 and an integrally associated gasifier turbine 22 for driving the compressor. Combustors 26, which each conventionally might comprise a fuel injector and combustion chamber, but in connection with the present invention comprise rotating fluidized bed combustors, are mounted for rotation about the central longitudinal axis 18 of the gas turbine engine. A gasifier section housing 30, including a front air inlet opening 32, directs the air and gases therethrough and supportably contains the front shaft assembly 14. The power turbine section 50 of engine 12 includes a rotatable rear shaft assembly 16 aligned with the front shaft assembly along central longitudinal axis 18. Rear shaft assembly 16 has a power turbine 40 and an integrally associated output shaft 42 which drives a suitable load. A rear housing 44 supportably contains the rear shaft assembly 16 and provides hot gas inlet and exhaust gas outlet openings. A recuperator section 52, which typically includes at least one conventional heat exchanger unit, but in connection with the present invention comprises at least one rotatable fluidized bed heat exchanger 54, is supportably mounted on front housing 30 and rear housing 44. The recuperator section provides a hot exhaust gas inlet 82, a cooled exhaust gas outlet 84 and appropriate ducting, including an air inlet duct 94 and a heated air outlet duct 80, to channel the flow of inlet air from the compressor 20 through the heat exchanger unit in a predetermined flowpath defined by heat exchange tubes therein. The air is heated while passing in heat exchange relation with the hot exhaust gases, which also pass through the heat exchanger unit along a predetermined flowpath over the heat exchange surfaces therein, and is directed into the combustors 26 for use as the fluidizing and combustion air, as will be discussed more fully hereinafter.

The foregoing will be further amplified by the following brief summary of operation wherein the flow path of the relatively hot engine exhaust gas is indicated on FIG. 1 by solid arrows, while the flow path of the relatively cooler air is indicated by broken line arrows.

Referring to FIG. 1, the gasifier section 28 of the gas turbine engine 12 cooperates with the turbine section 50 and recuperator section 52 in the following manner. With rotation of the front shaft assembly 14 the compressor portion 20 draws air axially through the inlet opening 32 into the housing 31 and discharges pressurized and somewhat heated air into the recuperator section air inlet duct 94. The compressed air enters the heat exchanger unit or units 54 where it is heated as it travels along a defined flow path through heat exchange tubes therein. After being heated the air passes out of the heat exchanger unit and is directed through outlet duct 80 into the front housing 30 where it is led to the rotating fluidized bed combustors 26.

Fuel is fed to combustors 26 and the beneficially heated and compressed air serves to fluidize the bed and react with the fuel to produce hot combustion gases. These gaseous products of combustion (shown hereinafter as solid arrows) are allowed to flow axially rightwardly when viewing FIG. 1 to impinge on and to powerably drive the gasifier turbine 22. Thus, the combustor exhaust gas serves to initially rotate the gasifier turbine to drive the integrally associated compressor 20. Thereafter, the exhaust gas travels further righwardly from within the front housing 30 to the rear housing 44 where it impinges on and powerably drives the power turbine 40 which subsequently delivers useful power to any applied load via the output shaft 42. The exhaust gas from the power turbine 40 can be effectively utilized to heat air, or even liquids, through an associated exhaust heat exchanger system. In the conventional gas turbine engine, the gas travels generally upwardly through the recuperator section 52 to transfer its heat to the inlet air. Specifically, the exhaust gas provides useful energy recovery by passing upwardly from within the rear housing 44 through recuperator section exhaust gas inlet 82 and through appropriate ducting into the fluidized bed rotating heat exchanger unit 54 of the present invention where it is cooled as it travels along a defined flow path over the heat exchange surfaces and gives up its heat to the inlet air (which preferably flows countercurrently thereto). The cooled exhaust gas is delivered through exhaust gas outlets 84 to the atmosphere.

Figure 2:
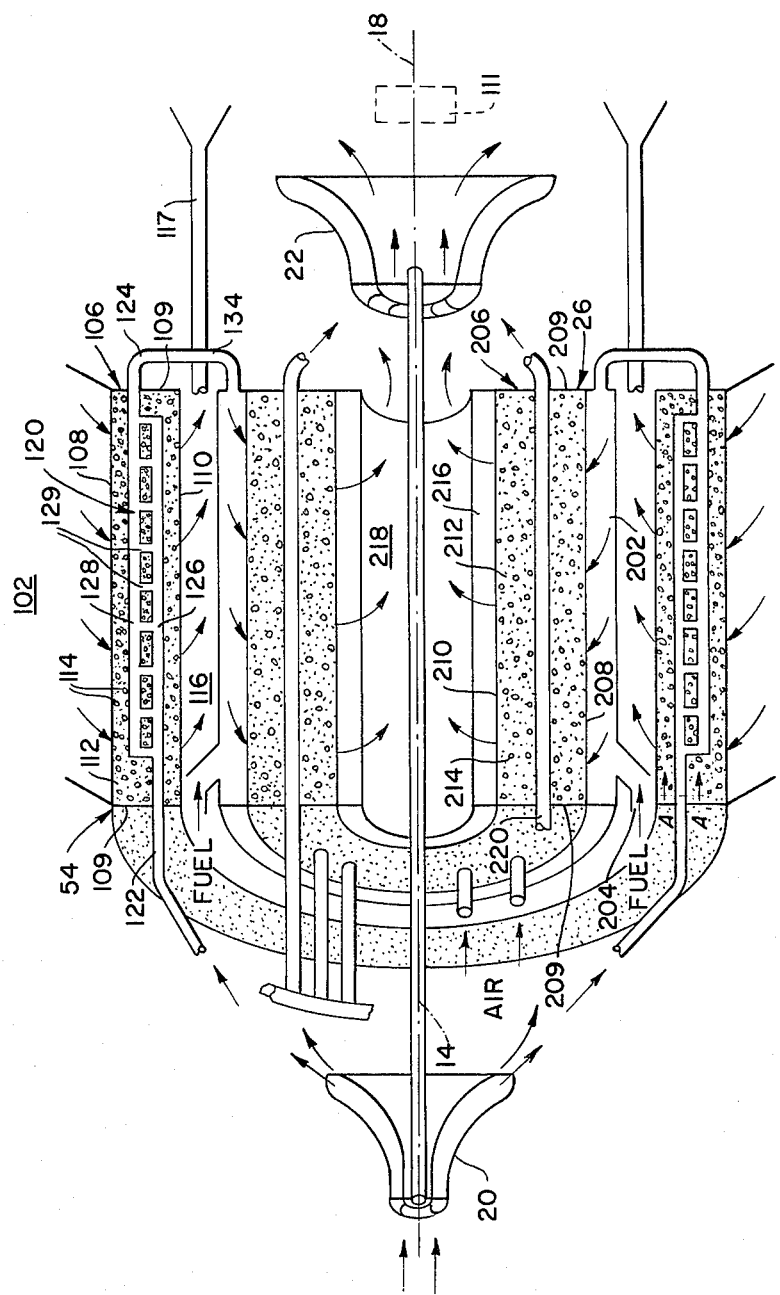
FIG. 2 is a schematically simplified section view of one embodiment of the combination rotating fluidized bed combustor and rotating fluidized bed heat exchanger of the present invention.
Figure 3:
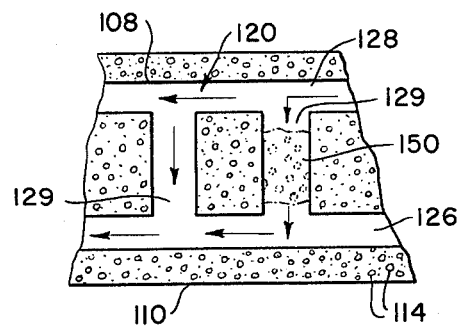
FIG. 3 is an enlarged schematically simplified section view of a portion of the heat exchanger of FIG. 2 showing another embodiment of the rotating fluidized bed heat exchanger portion of the combination of the present invention.
Figure 4:
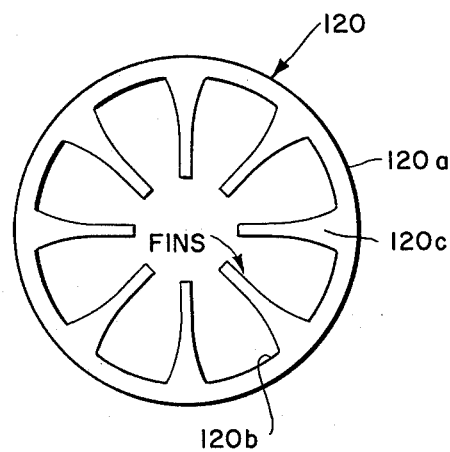
FIG. 4 is a section view along line A—A of FIG. 2 showing an exemplary finned interior wall construction for the heat exchanger tubes.

Referring now to FIGS. 2-4 a preferred form of combination rotating fluidized bed heat exchanger 54 and rotating fluidized bed combustor 26 of the present invention is more clearly depicted. As can be seen in detail the heat exchanger 54 comprises a chamber 102 into which a relatively hot first fluid, for example hot power turbine exhaust gas, may pass and be directed through the rotating fluidized bed of the heat exchanger as the heating and fluidizing medium therefor. Alternatively, if the relatively hot first fluid cannot be used to fluidize the bed, it may be used solely for heating purposes and a gaseous agent fed to the bed as the fluidizing medium. When the relatively hot first fluid is hot turbine exhaust, chamber 102 is in fluid flow communication with exhaust gas inlet 82 (see FIG. 1). The relatively hot first fluid gives up a portion of its thermal energy in passing through the heat exchanger 54 and exits as a cooled first fluid. The thermal energy transferred from the relatively hot first fluid heats the fluidized bed particles and heats a relatively cool second fluid, for example, gas turbine engine compressed inlet air, which is directed through heat exchange tubes disposed within the fluidized bed. For ease of description the rotating fluidized bed heat exchanger of the present invention will be described in connection with its use as a heat exchanger in the recuperator section of a conventional gas turbine engine wherein the relatively hot first fluid is power turbine exhaust gas and the relatively cool second fluid is compressed inlet air.

The fluidized bed portion 106 of heat exchanger 54 comprises an outer perforated cylindrical wall 108, an inner perforated cylindrical wall 110 and appropriate enclosing walls 109 defining therebetween an annular fluidizing chamber 112 in which pulverulent solid inert particles 114 such as sand, dolomite, coal ash, etc., are disposed. The perforations in walls 108 and 110 are small enough to contain particles 114 within chamber 112 but large enough to sustain the free flow of relatively hot compressed fluidizing air from the inlet chamber 102 through wall 108, into and through chamber 112, through wall 110 and into outlet core chamber 116.

The fluidized bed portion 106 rotates on horizontal, vertical or other appropriate axis, perferably about a longitudinal axis 18 which corresponds to the axis of coaxial cylindrical walls 108, 110 and, in the gas turbine engine of FIG. 1, corresponds to rotatable shaft assembly 14. Rotation is motivated by available rotational means, 111 (shown in phantom in FIG. 2), such as independent motor drive or appropriate gearing to drives for other conventional engine functions, and is controlled to a speed sufficient to impart a centrifugal force to the particles 114 within the bed. The centrifugal force causes the particles 114 to gravitate away from axis 18 toward outer perforated wall 108. The flow of hot, exhaust gas from inlet chamber 102 through perforated outer wall 108 opposes the centrifugally induced movement of the particles 114 and, in so doing, fluidizes the bed. The thermal energy of the hot exhaust gas heats the bed particles and the compressed air flowing within the heat exchange tubes 120 which extend substantially longitudinally through the bed. The resulting cooled exhaust gas leaves the bed through perforated wall 110 and passes into outlet core chamber 116 of heat exchanger 54. In the preferred embodiment illustrated in FIG. 2, core 116 is an annular chamber which directs the flow of cooled exhaust gas to the atmosphere through appropriate exhaust means, such as conduits 117 communicating with exhaust gas outlets 84.

The temperature within the bed is controlled in part by the temperature and flow rate of hot exhaust gas fed into the bed. In addition, bed temperature is controlled by controlling the amount of heat transfer to heat exchange tubes (or coils) 120 which pass substantially longitudinally through the bed. Tubes 120 generally rotate with the bed although it is not necessary that they do. In a preferred embodiment the tubes 120 direct the flow of compressed air longitudinally within the bed from an air inlet 122 generally adjacent perforated wall 110 to an air outlet 124 generally adjacent perforated wall 108. In this manner, the compressed air flows generally countercurrently to the direction of fluidizing hot exhaust gas flow through the bed. More specifically, tubes 120 include an inlet tube 126 extending longitudinally from air inlet 122 along cylindrical wall 110, an outlet tube 128 extending longitudinally along cylindrical wall 108 to air outlet 124 and a plurality of tubes 129 interconnecting the inlet and outlet tubes 126, 128. The interconnecting tubes 129 extend generally radially between the inlet and outlet tubes 126, 128. Compressed air entering tubes 126 through air inlet 122 is directed longitudinally along the length of the fluidized bed portion 106, radially relative to bed axis 18 in interconnecting tubes 129 and longitudinally along the length of the fluidized bed portion 106 in outlet tube 128 to air outlet 124. It is during the passage of the compressed air through the interconnecting tubes 129 that its flow is countercurrent or substantially opposite in direction to the flow of fluidizing and heating hot exhaust gas through the bed. Desirably compressed air is fed to and ducted away from the tubes 120 through a combination of conduits and plenums. A typical arrangement is illustrated in the aforementioned copending application entitled "Rotating Fluidized Bed Heat Exchanger". As can be seen most clearly in FIG. 2, in passing through the tubes 120 the compressed air is heated and the heated, compressed air is directed from air outlets 124 into outlet conduit means 134 which feeds the heated, compressed air to the inlet plenum chamber 202 of rotating fluidized bed combustor 26, as will be described more fully hereinafter.

It will be appreciated that the heat transfer coefficient between the heated fluidized bed particles 114 and the outer diameter surface 120a of the tubes 120 therein, particularly for a rotating fluidized bed, is extremely high, on the order of 240 BTU/hr-ft$^2$-°F. On the other hand the heat transfer coefficient between the compressed air and the inner diameter surface 120b of the tubes 120 is typically about 10-25 BTU/hr-ft$^2$-°F. Inasmuch as the amount of thermal energy which can be transferred through a surface is directly proportional to both the heat transfer coefficient and the surface area available for heat transfer, the limiting factor in transferring heat from the bed to the compressed air is the relatively poor heat transfer conditions inside tubes 120. This problem can be considerably alleviated by increasing either the inner surface heat transfer coefficient or the inner diameter surface area of the tubes. For example, as shown in FIG. 4, the inner diameter surface 120b can be increased, such as by a factor of 5 to 15, by providing a plurality of fins 120c therealong which extend generally radially into the flow area of the tubes. Alternatively, the inner surface heat transfer coefficient can be increased by creating a fluidized bed within tubes 120. This can be achieved using the heat exchanger configuration already described except that appropriate inert pulverulent solid fluidizable particles 150 (shown in phantom in FIG. 3) are disposed within tubes 120 and the direction of compressed air flow through tubes 120 is generally the same as the direction of hot exhaust gas flow through the bed. Thus, in this embodiment (flow direction through one interconnecting tube 129 shown in FIG. 3) the direction of compressed air flow is reversed, i.e., the air inlet and inlet tube become the air outlet and outlet tube and the air outlet and outlet tube become the air inlet and inlet tube. In this manner compressed air flow within the interconnecting tubes 129 is generally from the outer perforated wall 108 toward the inner perforated wall 110. The centrifugal force caused by bed rotation causes the particles within the tubes 120 to gravitate away from axis 118 toward outer wall 108 and the opposing flow of compressed air within the tubes fluidizes these particles.

The combustor 26 includes an inlet plenum chamber 202 into which compressed air is ducted. The compressed air may be preheated air, such as exits the heat exchanger unit of the recuperator section of a gas turbine engine (see FIG. 1) or, more particularly, the heated, compressed air exiting the tubes 120 of heat exchanger 54 through outlet conduit means 134. Fuel fed through entry port 204 is mixed with the compressed air prior to entering the inlet plenum chamber and is conveyed by the air to the fluidized rotating bed portion 206 of the combustor. In a preferred embodiment the fuel is powdered coal, or more desirably solvent refined coal which is nearly ash free to minimize ash removal problems. Alternatively, the fuel may be a liquid or a gas which can be suitably injected into the compressed air stream through port 204. The liquid may, but need not, be a residual petroleum or coal derivative.

The fluidized bed portion 206 comprises an outer perforated cylindrical wall 208, an inner perforated cylindrical wall 210 and appropriate enclosing walls 209 defining therebetween an annular fluidizing chamber 212 in which pulverulent solid particles 214 are disposed. The perforations in walls 208 and 210 are small enough to contain particles 214 within chamber 212 and to control the exhaust of solid combustion products but large enough to permit the entry of powdered fuel and to sustain the free flow of fluidizing air from the inlet plenum chamber 202 through wall 208, into and through chamber 212, through wall 210 and into outlet plenum chamber 216. The fluidized bed portion 206 rotates on the axis of the rotatable shaft assembly which, in the case of the gas turbine engine shown in FIG. 1, is horizontal shaft assembly 14 by independent motor drive or by appropriate gearing to drives for other conventional gas turbine engine functions. It will be appreciated that the bed could be rotated about a horizontal axis, as shown, about a vertical axis or, if advantageous within the particular configuration employed, about any desired axis. Rotation is controlled to a speed sufficient to impart a centrifugal force to the particles 214 within the bed adequate to fluidize the bed at the gas flow velocity. The centrifugal force causes the particles 214 to gravitate away from axis 18 toward outer perforated wall 208. The flow of fluidizing air from inlet plenum chamber 202 through perforated outer wall 208 opposes the centrifugally induced movement of the particles 214 and, in so doing, fluidizes the bed. Combustion occurs within the fluidizing chamber 212 between the fluidizing air and the fuel, e.g., powdered coal, to produce hot combustion gases within the bed. These hot combustion gases are swept out of the bed through inner perforated wall 210 by the flow of fluidizing air through the bed. The unreacted fluidizing air and the hot combustion gases pass from outlet plenum chamber 216 into the core 218 of the combustor 26. In the preferred embodiment illustrated in FIG. 2, where the combustor 26 of the present invention is used in connection with a conventional gas turbine engine, core 218 is an elongated cylindrical chamber which directs the flow of unreacted fluidizing air and combustion gases through the vanes or blades of gasifier turbine 22. As shown in FIG. 1, the hot exhaust gases from gasifier turbine 22 are ducted to and through the vanes or blades of power turbine 40 to produce useful engine work output via shaft 42.

The bed particles 214 are preferably either inert materials, e.g., sand, etc. and/or a sulfur absorber, e.g., dolomite, etc. Alternatively, the bed particles may be any other inert material generally found suitable for use in fluidized beds. If desired, a portion of the fluidized bed may be solid fuel, such as powdered coal, admixed with inert materials, such as a particulate mixture of coal, dolomite, sand and coal ash. A generally useful proportion of bed particles is 95% inert materials, 5% fuel. As the combustion proceeds, whether the fuel is a particulate component of the original bed or is carried into the bed with the fluidizing air, coal ash is formed and becomes either a part of the inert particulate portion of the bed or passes out of the bed through the inner perforated wall 210 with the unreacted fluidizing air and combustion gases. Any ash which passes out of the bed may be removed from the gas stream by a cyclone separator, not shown. Ash and sulfur remaining in the bed will eventually have to be circulated to a cleaning and reclaiming device, not shown. If solvent refined coal is used, ash and sulfur removal is generally not a problem.

The combustion temperature within the bed is controlled in part by the ratio of air to fuel fed into the bed. In addition, combustion temperature may be controlled by controlling the amount of heat transfer to cooling tubes (or coils) 220 which pass substantially longitudinally through the bed. The tubes 220 may, if desired, rotate with the bed portion 206 and are supplied with air from compressor 20. By pre-determining the rate of flow of air through the tubes and the number of tubes carrying air through the bed, localized temperatures within the bed are readily controlled. It is recommended to control the temperature of the bed to about 900° C. This minimizes fusion of the ash constituent of the bed and prevents formation of "glassy" particles which can cause turbine blade erosion if they escape through the inner perforated wall of the fluidized bed. The heated air exhausting tubes 220 may be directed, as shown in FIG. 2, into admixture with the unreacted fluidizing air and combustion gases from core 218 and directed through the vanes of gasifier turbine 22. In this manner, the temperature and flow volume of gases passing through turbine 22 can be controlled.

In the preferred configuration of the present invention, in accordance with the objective of attaining maximum compactness, the combustor 26 is nested within the heat exchanger 54. Alternatively, depending upon the use for which the combustor/heat exchanger combination is intended, the combustor may be disposed around the outside of the heat exchanger, i.e., the heat exchanger may be nested within combustor 26. In other situations, especially where the length of the engine is not as critical as the frontal area, e.g., in mobile applications such as torpedoes, aircraft, etc., the heat exchanger 54 and combustor 26 may be located side by side or end to end. However the heat exchanger and combustor are physically packaged, it will be appreciated that they may or may not be mounted on the same axis of rotation and their rotative speeds may or may not be the same. This depends upon numerous design parameters, including the type of fluidized bed medium used in the components.

INDUSTRIAL APPLICABILITY

The rotating fluidized bed combustor and heat exchanger combination of the present invention has broad applicability but is particularly useful in gas turbine engines. When operating in this capacity the combustor is preferably nested within the heat exchanger and the fluidized bed portions 106 and 206 preferably rotate about the main compressor and turbine axis. Rotation is motivated by suitable gearing to other conventional engine functions. Upon rotation of the front shaft assembly 14, the compressor 20 draws air into inlet opening 32, compresses the air, and directs the air flow into rotating fluidized bed heat-exchanger 54 through recuperator section inlet duct 94. The compressed air follows a defined flow path within the heat exchanger tubes 120 and is heated by the hot power turbine exhaust gas which also follows a defined, but different, flow path within the heat exchanger. The compressed air is distributed via air inlets 122 into tubes 120 in the fluidized bed. Compressed air flows through the bed within inlet tube 126, through interconnecting tubes 129, within outlet tube 128 and exits the bed via air outlets 124 into outlet conduit means 134. In its passage through tubes 120 the relatively cool compressed air is heated and the heated compressed air is directed from outlet conduit means 134 into rotating fluidized bed combustors 26. Powdered coal fuel is fed through entry port 204 into the heated compressed air stream and is conveyed with the stream via inlet plenum chamber 202 through perforated outer wall 208 into fluidization chamber 212. Inasmuch as the rotation of fluidized bed portion 206 causes the particles 214 within chamber 212 to gravitate toward outer wall 208, the opposing flow of the compressed air stream into the chamber 212 fluidizes the particles. Combustion occurs within fluidizing chamber 212 between the compressed air and the powdered coal fuel to produce hot combustion gases within the bed. These hot combustion gases are swept out of the bed together with unreacted fluidizing compressed air through the bed. The unreacted compressed air and hot combustion gases pass through outlet plenum chamber 216 into core 218 of combustor 26 and are directed through the vanes of gasifier turbine 22 to drive it and, through shaft 14, to drive compressor 20 as well. The exhaust gas from gasifier turbine 22 is directed through the vanes of the power turbine 40 which delivers useful output work via output shaft 42. Temperatures within the fluidized bed portion 206 of combustors 26 are controlled and the volume of gas flowing through the turbines 22 and 40 is supplemented by directing compressed air from compressor 20 through cooling tubes 220 which extend longitudinally through bed portion 206.

The exhaust gas from the power turbine 40 is then ducted into the rotating fluidized bed heat exchanger 54 to serve as the heating and fluidizing gas for transferring exhaust gas heat to the inlet compressed air via the fluidized bed 106 in the heat exchanger 54. Specifically, the exhaust gas is directed into inlet chamber 102 of heat exchanger 54 and through perforated outer wall 108 into fluidization chamber 112. Inasmuch as the rotation of the fluidized bed portion 106 of heat exchanger 54 causes the particles 114 within chamber 112 to gravitate toward outer wall 108, the opposing flow of the exhaust gas into the chamber fluidizes the particles. In passing through the fluidized bed of particles the relatively hot exhaust gas transfers heat to the particles and passes over heat exchanger tubes 120 to transfer heat to the compressed air flowing therein. The resulting cooled exhaust gases pass out of chamber 112 through inner perforated wall 110 into core chamber 116 which directs the flow of cooled exhaust gas via conduits 117 to the atmosphere through exhaust gas outlets 84.

It is anticipated that further aspects of the present invention can be obtained from the foregoing description and the appended claims.

We claim:

1. A combination rotatable fluidized bed heat exchanger (54) and rotatable fluidized bed combustor (26), said heat exchanger (54) comprising:
   a. a first elongated perforated wall (108);
   b. a second perforated wall (110) spaced apart and substantially co-extensive with said first perforated wall (108);
   c. enclosing walls (109) defining with said first and second perforated walls (108, 110) a first fluidization chamber (112);
   d. a first bed of pulverulent solid particles (114) in said first chamber (112);
   e. means (111) for rotating said first chamber (112) about an axis (18) to cause the first particles (114) to centrifugally gravitate toward said first perforated wall (108);
   f. means (102) for feeding a relatively hot first fluid into said first chamber (112) through said first perforated wall (108) and out of said first chamber (112) through said second perforated wall (110), said first fluid heating said first particles (114) in said first chamber (112);
   g. means (102) for feeding a gaseous agent into said first chamber (112) through said first perforated wall (108) and out of said first chamber (112) through said second perforated wall (110), said gaseous agent having flow characteristics suitable for fluidizing said first particles (114) in said first chamber (112);
   h. at least one tube (120) in said first chamber (112) extending substantially co-extensively with said walls (108, 110) for passing a relatively cool second fluid therethrough, whereby said second fluid is heated by the heat bed particles and said relatively hot first fluid is cooled; and
   i. means (134) for directing said heated second fluid to said rotatable fluidized bed combustor (26) for exothermically reacting said heated second fluid and a fuel; said combustor (26) comprising:
   j. a third elongated perforated wall (208);
   k. A fourth perforated wall (210) spaced apart and substantially co-extensive with said third perforated wall (208);
   l. enclosing walls (209) defining with said third and fourth perforated walls (208, 210) a second fluidization chamber (212);
   m. a second bed of pulverulent solid particles (214) in said second chamber (212);
   n. means (14) for rotating said second chamber (212) about an axis (18) to cause the second particles (214) to centrifugally gravitate toward said third perforated wall (208);
   o. means (202) for feeding said heated second fluid into said second chamber (212) through said third perforated wall (208) and out of said second chamber (212) through said fourth perforated wall (210), said heated second fluid having flow characteristics suitable for fluidizing said second particles (214) in said second chamber (212);
   p. means (204, 202) for introducing a combustible fuel through said third perforated wall (208) into said second chamber (212), said fuel reacting with at least a portion of said heated second fluid in said second chamber (212) to form gaseous combustion products;
   q. means (216) for receiving said gaseous combustion products and unreacted heated second fluid exiting from said second chamber (212) through said fourth perforated wall (210); and
   r. means (218) for directing said unreacted heated second fluid and said gaseous combustion products exiting said fourth perforated wall (210) away from said second chamber (212).

2. A combination, as claimed in claim 1, wherein said relatively hot first fluid is a gas and comprises said gaseous agent for fluidizing said particles in said first chamber (112).

3. A combination, as claimed in claim 2, wherein said at least one tube (120) directs the flow of said relatively cool second fluid longitudinally within said chamber (112) from an inlet (122) generally adjacent said second perforated wall (110) to an outlet (124) generally adjacent said first perforated wall (108), whereby said relatively cool second fluid flows countercurrently to said relatively hot gas.

4. A combination, as claimed in claims 1 or 2, wherein said at least one tube (120) comprises an inlet tube (126) extending substantially co-extensively with and adjacent said second perforated wall (110), an outlet tube (128) extending substantially co-extensively with and adjacent said first perforated wall (108) and fluid flow means (129) interconnecting said inlet and outlet tubes (126, 128), whereby said relatively cool second fluid enters said first chamber (112) adjacent said second perforated wall (110) and exits said first chamber (112) adjacent said first perforated wall (108).

5. A combination, as claimed in claim 4, wherein said fluid flow means comprises at least one interconnecting tube (129), whereby said relatively cool second fluid in said interconnecting tube flows countercurrently to said relatively hot first fluid passing through said first chamber (112).

6. A combination, as claimed in claim 5, wherein said fluid flow means comprises a plurality of interconnecting tubes (129).

7. A combination, as claimed in claim 4, wherein said means for directing said heated second fluid to said combustor (26) includes conduit means (134) in fluid flow communication with said outlet tube (128).

8. A combination, as claimed in claims 1, 2 or 3, including means (120c) for increasing the inner surface area (120b) of said at least one tube (120).

9. A combination, as claimed in claim 8, wherein said surface area increasing means comprises a plurality of fins (120c) extending from said inner surface (120b) of said at least one tube (120) into the flow area of said tube.

10. A combination, as claimed in claim 8, wherein said inner diameter surface area increasing means (120c) increases the surface area by a factor of 5 to 15.

11. A combination, as claimed in claims 1, 2 1 or 3, wherein said relatively cool second fluid is a gas.

12. A combination, as claimed in claim 4, wherein said first and second walls (108, 110) are substantially cylindrical and coaxial and said second wall (110) has a smaller diameter than said first wall (108).

13. A combination, as claimed in claim 12, wherein said first chamber (112) comprises the annular space between said walls (108, 110).

14. A combination, as claimed in claim 13, wherein said axis of rotation of said first chamber (112) is coincident with the longitudinal axis (18) of said cylindrical walls (108, 110).

15. A combination, as claimed in claim 14, wherein said first solid particles (114) are inert.

16. A combination, as claimed in claims 1 or 2, wherein said at least one tube (120) includes a bed of pulverulent solid particles (150) therein and directs the flow of said relatively cool second fluid longitudinally within said bed from an inlet generally adjacent said first perforated wall (108) to an outlet generally adjacent said second perforated wall (110), whereby said flow of relatively cool second fluid in said at least one tube (120) fluidizes said particles therein.

17. A combination, as claimed in claim 16, wherein said relatively cool second fluid is a gas.

18. A combination, as claimed in claims 1 or 2, wherein said combustible fuel is a powdered solid fuel and said introducing means include means (202) for combining said fuel with said heated second fluid prior to feeding said heated second fluid through said third perforated wall (208).

19. A combination, as claimed in claims 1 or 2, wherein said third and fourth walls (208, 210) are substantially cylindrical and coaxial and said fourth wall (210) has a smaller diameter than said third wall (208).

20. A combination, as claimed in claim 19, wherein said second chamber (212) comprises the annular space between said walls (208, 210).

21. A combination, as claimed in claim 20, wherein said axis of rotation of said second chamber (212) is coincident with the longitudinal axis (18) of said cylindrical walls (208, 210).

22. A combination, as claimed in claim 21, including at least one tube (220) extending substantially longitudinally through said second chamber (212) for passing a gaseous heat exchange fluid therethrough.

23. A combination, as claimed in claim 22, wherein said at least one tube (220) directs the heat exchange fluid exiting therefrom into admixture with said unreacted heated second fluid and gaseous combustion products.

24. A combination, as claimed in claims 1 or 2, wherein said first chamber (112) and second chamber (212) rotate about the same axis (18).

25. A combination, as claimed in claims 1 or 2, wherein said first chamber (112) and second chamber (212) rotate at the same speed.

26. A combination, as claimed in claims 1 or 2, wherein said combustor (26) and said heat exchanger (54) are arranged in nesting relationship.

27. A combination, as claimed in claim 26, wherein said combustor (26) is nested within said heat exchanger (54).

28. A combination as claimed in claims 1, 2 or 3, wherein said first, second, third and fourth walls (108, 110, 208, 210) are substantially cylindrical and coaxial, said fourth wall (210) having a smaller diameter than said third wall (208), said third wall (208) having a smaller diameter than said second wall (110) and said second wall (110) having a smaller diameter than said first wall (108).

29. A combination, as claimed in claim 28, wherein said axis of rotation of said first and second chambers (112, 212) comprises the longitudinal axis (18) of said walls (108, 110, 208, 210).

30. A combination, as claimed in claim 28, wherein said second perforated wall (110) and said third perforated wall (208) define therebetween an annular space (116), said space comprising means for directing said cooled first fluid to exhaust.

31. A combination, as claimed in claim 28, wherein the cylindrical space (218) enclosed by said fourth perforated wall (210) comprises said means for directing said unreacted heated second fluid and said gaseous combustion products away from said second chamber (212).

32. A combination, as claimed in claim 28, wherein said first chamber (112) comprises the annular space between said first and second walls (108, 110), said second chamber (212) comprises the annular space between said third and fourth walls (208, 210) and said first and second chambers (112, 212) rotate about the same axis (18); said second wall (110) and said third wall (208) define therebetween an annular space (116), said space comprising means for directing said cooled first fluid to exhaust; the cylindrical space (218) enclosed by said fourth wall (210) comprises said means for directing said unreacted second fluid and said gaseous combustion products away from said second chamber (212); and said at least one tube (120) comprises an inlet tube (126) extending substantially co-extensively with and adjacent said second perforated wall (110), an outlet tube (128) extending substantially co-extensively with and adjacent said first perforated wall (108) and fluid flow means (129) interconnecting said inlet and outlet tubes (126, 128) whereby said compressed gas enters said first chamber (112) adjacent said second perforated wall (110) and exits said chamber (112) adjacent said first perforated wall (108).

33. A combination, as claimed in claim 32, wherein said combustible fuel is a powdered solid fuel and said introducing means include means (202) for combining said fuel with said heated second fluid prior to feeding said heated second fluid through said third perforated wall (208).

34. In a gas turbine engine (12) including a compressor (20), a combustor (26), a gasifier turbine (22), a first shaft (14) mounting said compressor (20) adjacent a first end thereof and said gasifier turbine (22) adjacent the other end thereof, said turbine (22) having blades positioned in the path of exhaust gases exiting said combustor (26) to drive said first shaft (14) and said compressor (20), a power turbine (40) having blades positioned in the path of exhaust gases exiting said gasifier turbine (22), a second shaft (42) driven by said power turbine (40) for delivering output work, a heat exchanger (54) for receiving compressed gas from said compressor (20), heating said compressed gas therein and passing said heated compressed gas to said combustor (26) and for receiving exhaust gas from said power turbine (40), cooling said exhaust gas while transferring some of its heat to said compressed gas and exhausting the resulting cooled exhaust gas, the improvement comprising:

a combination rotatable fluidized bed heat exchanger (54) and rotatable fluidized bed combustor (26), said heat exchanger (54) comprising:
 a. a first elongated perforated wall (108);
 b. a second perforated wall (110) spaced apart and substantially co-extensive with said first perforated wall (108);
 c. enclosing walls (109) defining with said first and second perforated walls (108, 110) a first fluidization chamber (112);
 d. a first bed of pulverulent solid particles (114) in said first chamber (112);
 e. means (111) for rotating said first chamber (112) about an axis (18) to cause the first particles (114) to centrifugally gravitate toward said first perforated wall (108);
 f. means (102) for feeding said exhaust gas into said first chamber (112) through said first perforated wall (108) and out of said first chamber (112) through said second perforated wall (110), said exhaust gas heating said first particles (114) and having flow characteristics suitable for fluidizing said first particles (114) in said first chamber (112);
 g. at least one tube (120) in said first chamber (112) extending substantially co-extensively with said walls (108, 110) for passing said compressed gas therethrough, whereby said compressed gas is heated by the heated bed particles and said exhaust gas is cooled; and
 h. means (134, 80) for directing said heated compressed gas to said rotatable fluidized bed combustor (26) for exothermically reacting said heated compressed gas and a fuel; said combustor (26) comprising:
 i. a third elongated perforated wall (208);
 j. a fourth perforated wall (210) spaced apart and substantially co-extensive with said third perforated wall (208);
 k. enclosing walls (209) defining with said third and fourth perforated walls (208, 210) a second fluidization chamber (212);
 l. a second bed of pulverulent solid particles (214) in said second chamber (212);
 m. means (14) for rotating said second chamber (212) about an axis (18) to cause the second particles (214) to centrifugally gravitate toward said third perforated wall (208);
 n. means (202) for feeding said heated, compressed gas into said second chamber (212) through said third perforated wall (208) and out of said second chamber (212) through said fourth perforated wall (210), said heated, compressed gas having flow characteristics suitable for fluidizing said second particles (214) in said second chamber (212);
 o. means (204, 202) for introducing a combustible fuel through said third perforated wall (208) into said second chamber (212), said fuel reacting with at least a portion of said heated, compressed gas in said second chamber (212) to form gaseous combustion products;
 p. means (216) for receiving the hot exhaust gas exiting from said second chamber (212) through said fourth perforated wall (210), said hot exhaust gas comprising said gaseous combustion products and unreacted compressed gas; and
 q. means (218) for directing said hot exhaust gas exiting said fourth perforated wall (210) to said gasifier turbine (22) and power turbine (40).

35. A gas turbine engine, as claimed in claim 34, wherein said at least one tube (120) directs the flow of said compressed gas longitudinally within said chamber (112) from an inlet (122) generally adjacent said second perforated wall (110) to an outlet (124) generally adjacent said first perforated wall (108), whereby said compressed gas flows countercurrently to said exhaust gas.

36. A gas turbine engine, as claimed in claim 34, wherein said at least one tube (120) comprises an inlet tube (126) extending substantially co-extensively with and adjacent said second perforated wall (110), and outlet tube (128) extending substantially co-extensively with and adjacent said first perforated wall (108) and fluid flow means (129) interconnecting said inlet and outlet tubes (126, 128), whereby said compressed gas enters said first chamber (112) adjacent said second perforated wall (110) and exits said first chamber (112) adjacent said first perforated wall (108)

37. A gas turbine engine, as claimed in claim 36, wherein said fluid flow means comprises at least one interconnecting tube (129), whereby said compressed gas in said interconnecting tube flows countercurrently to said exhaust gas passing through said first chamber (112).

38. A gas turbine engine, as claimed in claim 37, wherein said fluid flow means comprises a plurality of interconnecting tubes (129).

39. A gas turbine engine, as claimed in claim 36, wherein said means for directing said heated compressed gas to said combustor (26) includes conduit means (134) in fluid flow communication with said outlet tube (128).

40. A gas turbine engine, as claimed in claims 34 or 35, including means (120c), for increasing the inner diameter surface area (120b) of said at least one tube (120).

41. A gas turbine engine, as claimed in claim 40, wherein said surface area increasing means comprises a plurality of fins (120c) extending from said inner surface (120b) of said at least one tube (120) into the flow area of said tube.

42. A gas turbine engine, as claimed in claim 40, wherein said inner diameter surface area increasing means (120c) increases the surface area by a factor of 5 to 15.

43. A gas turbine engine, as claimed in claim 36, wherein said first and second walls (108, 110) are substantially cylindrical and coaxial and said second wall (110) has a smaller diameter than said first wall (108).

44. A gas turbine engine, as claimed in claim 43, wherein said first chamber (112) comprises the annular space between said walls (108, 110).

45. A gas turbine engine, as claimed in claim 44, wherein said axis of rotation of said first chamber (112) is coincident with the longitudinal axis (18) of said cylindrical walls (108, 110).

46. A gas turbine engine, as claimed in claim 45, wherein said first solid particles (114) are inert.

47. A gas turbine engine, as claimed in claim 34, wherein said at least one tube (120) includes a bed of pulverulent solid particles (150) therein and directs the flow of said compressed gas longitudinally within said sed from an inlet generally adjacent said first perforated wall (108) to an outlet generally adjacent said second perforated wall (110), whereby said flow of compressed gas in said at least one tube (120) fluidizes said particles therein.

48. A gas turbine engine, as claimed in claim 34, wherein said combustible fuel is a powdered solid fuel and said introducing means include means (202) for combining said fuel with said compressed gas prior to feeding said heated compressed gas through said third perforated wall (208).

49. A gas turbine engine, as claimed in claim 34, wherein said third and fourth walls (208, 210) are substantially cylindrical and coaxial and said fourth wall (210) has a smaller diameter than said third wall (208).

50. A gas turbine engine as claimed in claim 49, wherein said second chamber (212) comprises the annular space between said walls (208, 210).

51. A gas turbine engine, as claimed in claim 50, wherein said axis of rotation of said second chamber (212) is coincident with the longitudinal axis (18) of said cylindrical walls (208, 210).

52. A gas turbine engine, as claimed in claim 51, including at least one tube (220) extending substantially longitudinally through said second chamber (212) for passing a gaseous heat exchange fluid therethrough.

53. A gas turbine engine as claimed in claim 52, wherein said at least one tube (220) directs the heat exchange fluid exiting therefrom into admixture with said exhaust gas.

54. A gas turbine engine, as claimed in claim 34, wherein said first chamber (112) and second chamber (212) rotate about the same axis (18).

55. A gas turbine engine, as claimed in claim 54, wherein said axis of rotation of said first (112) and second (212) chambers is substantially coextensive with said first shaft (14).

56. A gas turbine engine, as claimed in claim 34, wherein said first chamber (112) and second chamber (212) rotate at the same speed.

57. A gas turbine engine, as claimed in claim 34, wherein said combustor (26) and said heat exchanger (54) are arranged in nesting relationship.

58. A gas turbine engine, as claimed in claim 57, wherein said combustor (26), is nested within said heat exchanger (54).

59. A gas turbine engine, as claimed in claims 34 or 35 wherein said first, second, third and fourth walls (108, 110, 208, 210) are substantially cylindrical and coaxial, said fourth wall (210) having a smaller diameter than said third wall (208), said third wall (208) having a smaller diameter than said second wall (110) and said second wall (110) having a smaller diameter than said first wall (108).

60. A gas turbine engine, as claimed in claim 59, wherein said second perforated wall (110) and said third perforated wall (208) define therebetween an annular space (116), said space comprising means for directing said cooled exhaust gas to exhaust.

61. A gas turbine engine, as claimed in claim 59, wherein the cylindrical space (218) enclosed by said fourth perforated wall (210) comprises said means for directing said exhaust gas to said gasifier turbine (22).

62. A gas turbine engine, as claimed in claim 59, wherein said first chamber (112) comprises the annular space between said first and second walls (108, 110), said second chamber (212) comprises the annular space between said third and fourth walls (208, 210) and said first and second chambers (112, 212) rotate about the same axis (18); said second wall (110) and said third wall (208) define therebetween an annular space (116), said space comprising means for directing said cooled exhaust gas to exhaust; the cylindrical space (218) enclosed by said fourth wall (210) comprises said means for directing said hot exhaust gas to said gasifier turbine (22); and said at least one tube (120) comprises an inlet tube (126) extending substantially co-extensively with and adjacent said second perforated wall (110), an outlet tube (128) extending substantially co-extensively with and adjacent said first perforated wall (108) and fluid flow means (129) interconnecting said inlet and outlet tubes (126, 128) whereby said compressed gas enters said first chamber (112) adjacent said second perforated wall (110) and exits said first chamber (112) adjacent said first perforated wall (108).

63. A gas turbine engine, as claimed in claim 62, wherein said combustible fuel is a powdered solid fuel and said introducing means include means (202) for combining said fuel with said compressed gas prior to feeding said heated compressed gas through said third perforated wall (208).

* * * * *